July 24, 1928.  W. H. STADDEN  1,677,993
VALVE
Filed July 25, 1927   2 Sheets-Sheet 1
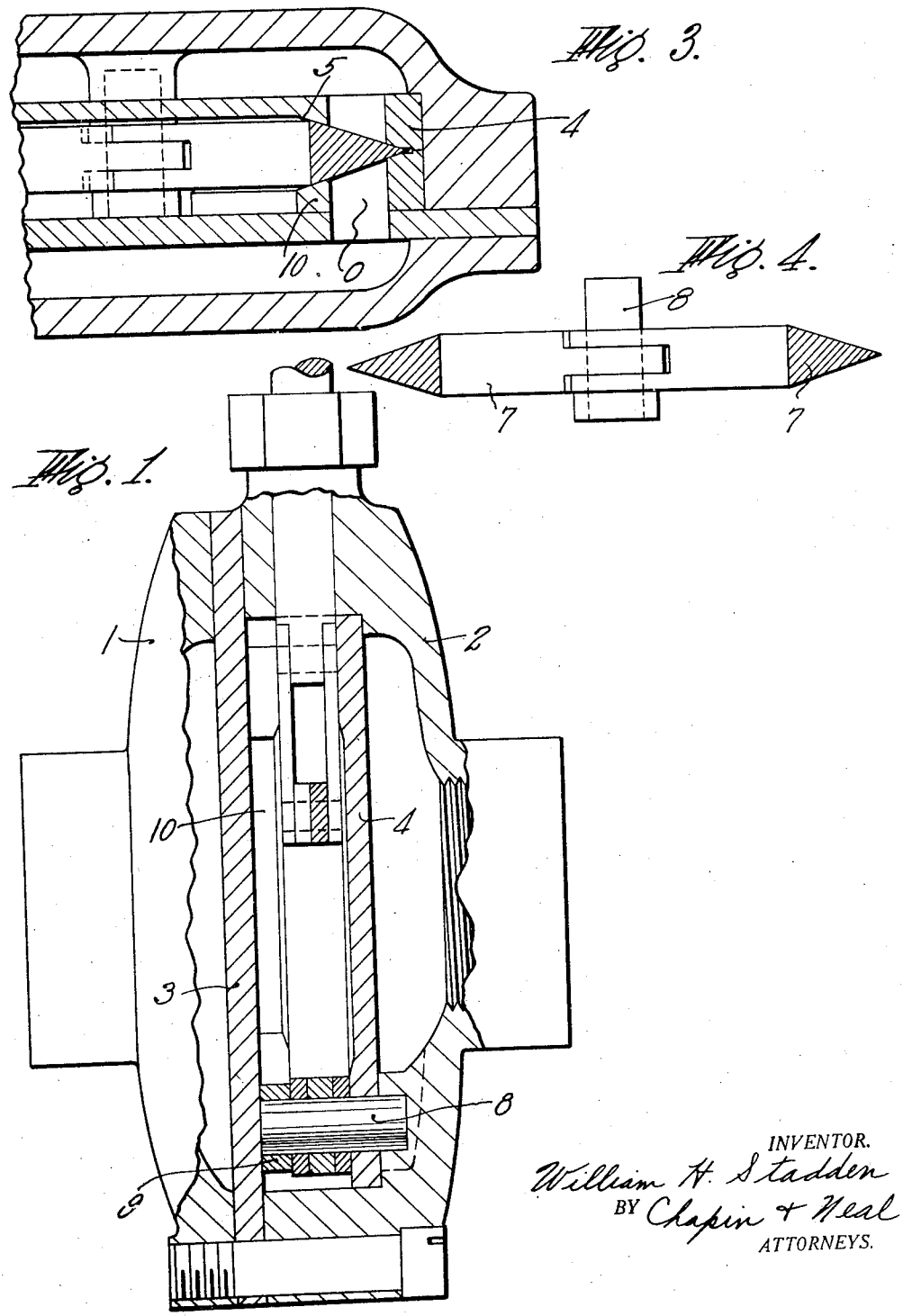
INVENTOR.
William H. Stadden
BY Chapin & Neal
ATTORNEYS.

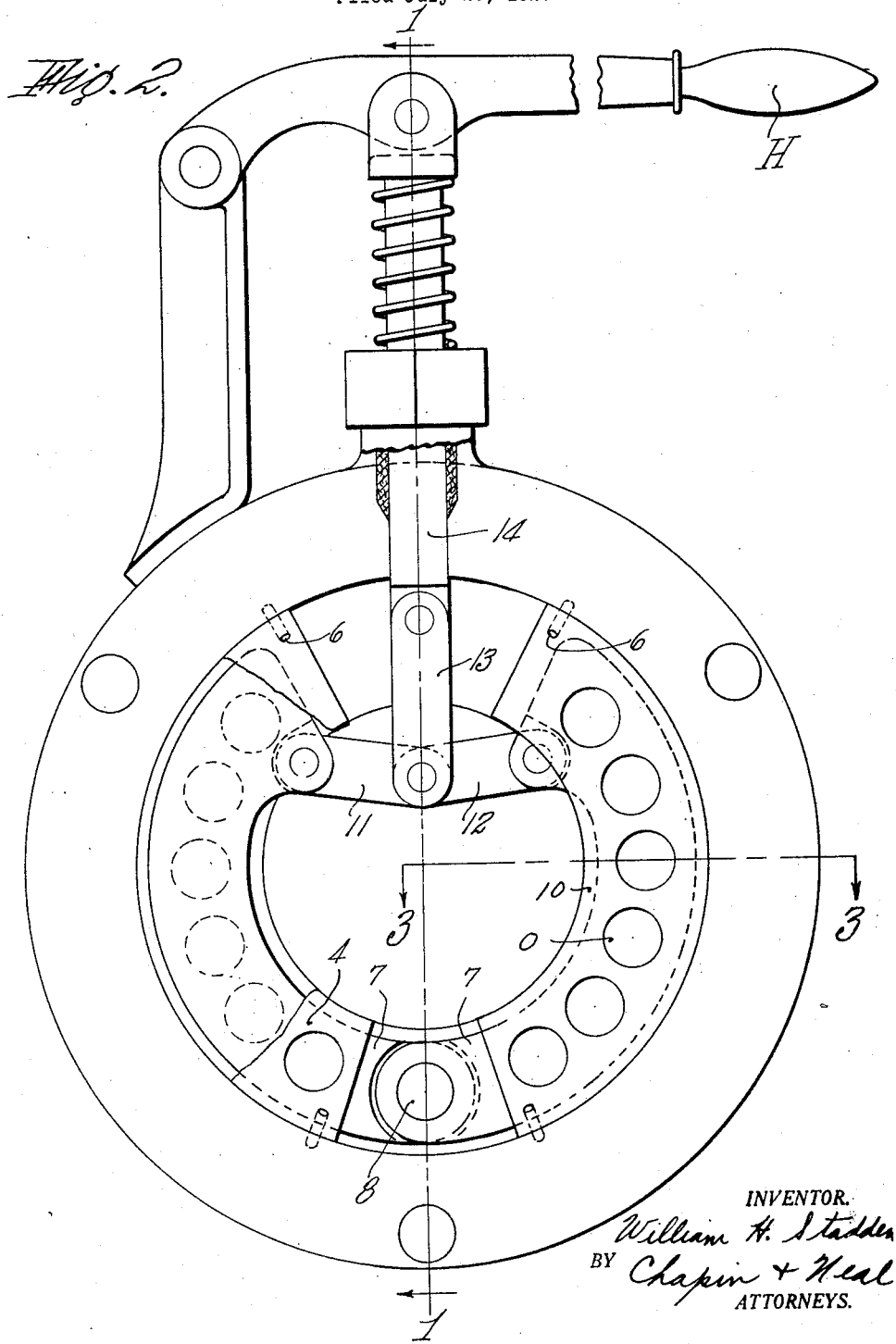

Patented July 24, 1928.

1,677,993

UNITED STATES PATENT OFFICE.

WILLIAM H. STADDEN, OF SPRINGFIELD, MASSACHUSETTS.

VALVE.

Application filed July 25, 1927. Serial No. 208,270.

This invention relates to an improved valve construction in which the new arrangement of the valve ports and the means for opening and closing them are the principal features of novelty. The objects of the invention will be best understood from a consideration of the structure and mode of operation described in an illustrative embodiment.

In the drawings—

Fig. 1 is a section through the valve, taken on line 1—1 of Fig. 2;

Fig. 2 is a face view of the interior of the valve with parts removed and broken away, to help show the interior structure;

Fig. 3 is a partial sectional view taken on line 3—3 of Fig. 2; and

Fig. 4 is a detail sectional view of the valve closing parts.

The form shown is made up of the valve casing parts 1 and 2 bolted together, with the assembled parts held in place by a plate 3. The part 2 has a shoulder to receive a plate section 4 like a saucer, with a beveled outer edge surface facing inwardly as at 5 and held to part 2 by its position, as indicated.

Against the beveled edge surface of section 4, I assemble two closure members 7 (of triangular cross section), pivoted together on a pin 8. The latter has one end in a boss of part 2 and the other provided with a collar 9. The character of pivotal connection on the pin is shown in Fig. 4 in which one end of a member 7 is forked to straddle a reduced part of the other member 7 with pin 8 passing through aligned holes in these parts. Additional ring sections 10 with beveled edges to fit with the bevel on the adjacent side of the members 7, are fastened in position as indicated in Fig. 2 so that members 7 are provided with valve seats in ring members 4 and 10, as will be further described.

The assembly and position of sections 4, members 7 and sections 10 are best shown in Fig. 2. The valve openings are made as a series of aligned holes through plate 3, sections 10, and 4. One set of openings is best seen in Fig. 3. As shown in Fig. 2, there are six of such sets of openings on each side of pivot pin 8 and these openings are controlled by the movements of the pivoted members 7.

To provide for such movements, the free or upper ends of 7 (Fig. 2) are pivotally connected with links 11 and 12, each pivoted on the lower end of link 13. A reciprocable rod 14 passes through a stuffing box to pivotally connect with the upper end of link 13. A handle H is arranged to depress rod 14, and a spring between the stuffing box and handle is positioned to raise rod 14, as is clear from Fig. 2.

As shown, the linkage 13, 11, and 12 are arranged as a toggle and great force may be applied in closing or opening the valve. For illustration only, the closure is by spring action, but the raising of rod 14 may be by hand, spring, or other power action with great effect in forcing links 11 and 12 to straighten out and swing members 7 to their tapered seats whereby all the valve openings O are closed.

Of course the members 7 may be fitted so carefully to their tapered seats that they will close all the openings O at one time. But one of the advantages of this valve is that one can make the curvature of members 7 just slightly greater than the curvature of their corresponding seats. They can then be pivoted on pin 8 so that as they move to their seats, the lower openings O (Fig. 2) will be closed first and then members 7 made of material as spring steel, will have a slight roll into their seats and close the openings O successively on each side of pin 8. The opening will be by the same kind of a roll in the reverse direction.

One advantage of this construction and mode of operation is that the parts will not need to be fitted so accurately as would otherwise be the case.

At each opening O there are two valve closures, either one of which will be sufficient to stop or start the flow in accordance with the position of the adjacent member 7. If one member 7 on one side of pin 8 seats first, the linkage is such that the force of closing continues on the other member 7 until it is closed.

When the parts are once made up and assembled, their operation automatically compensates for wear. There is, however, provision against rapid wear by reason of the rolling of the valve closure into place, rather than a sliding or grinding action as the closures are forced against their seats.

Various changes in the form of equivalents can be made in the illustrative embodiment of the invention shown without departing from the spirit of the invention, as pointed out in the following claims.

I claim:

1. A valve construction, including a curved valve seat having a tapered cross section, with a plurality of port openings therein on each side of the valve seat, a pivoted valve-closure of curved form having a wedge shaped cross section adapted to fit the tapered cross section of the valve seat and of approximately the same curvature as the seat, and mechanism to force the closure to turn on its pivot and wedge in said seat.

2. A valve construction including a curved valve seat having a tapered cross section with port openings therein, a pivoted valve closure having a wedge shaped cross section adapted to fit the tapered cross section of the valve seat by rolling therein and mechanism to cause such rolling action while one end of the closure is held on its pivot.

3. A valve construction, including a casing having therein a curved groove of tapered cross section with a plurality of valve ports in each of the opposite sides of the groove, a valve closure of approximately the same curvature as said groove and with a cross section adapted to fit the groove, a pivot for the valve closure and means to turn the closure on its pivot to and from seating position in said groove.

4. A valve construction, including a casing having therein a curved groove of tapered cross section with valve ports in the sides of the groove, a valve closure with a slightly greater curved form than the curve of the groove and with a cross section to fit the groove, said valve closure being of material adapting its form to be sprung to a slightly larger curvature, a pivot for the valve closure and means to move the latter on its pivot and roll it into the groove while springing the closure to substantially the same curvature as the groove at the valve ports.

5. A valve construction comprising a casing having therein a pair of pivoted valve closures of triangular cross section and curved form, a common pivot for the closures, a grooved valve seat of triangular cross section on each side of said pivot adapted to fit said closures, ports in the sides of said grooves, and means to turn the closures about their pivot to move them to and from closing position.

6. A valve construction comprising a casing, a grooved valve seat of circular form in said casing, ports extending through the sides of said grooved seat, a pair of valve closures with a cross section formed to fit the grooved seat, a pivot for said closures about which they may turn to and from said seat, a toggle mechanism connected to said closures to swing them on their pivot and means for actuating the toggle mechanism from without the casing.

In testimony whereof I have affixed my signature.

WILLIAM H. STADDEN.